US009147255B1

United States Patent
Zhang et al.

(10) Patent No.: US 9,147,255 B1
(45) Date of Patent: Sep. 29, 2015

(54) RAPID OBJECT DETECTION BY COMBINING STRUCTURAL INFORMATION FROM IMAGE SEGMENTATION WITH BIO-INSPIRED ATTENTIONAL MECHANISMS

(71) Applicant: HRL Laboratories, LLC, Malibu, CA (US)

(72) Inventors: Lei Zhang, Los Angeles, CA (US); Shinko Y. Cheng, Cupertino, CA (US); Yang Chen, Westlake Village, CA (US); Alexander L. Honda, Sunnyvale, CA (US); Kyungnam Kim, Oak Park, CA (US); Deepak Khosla, Camarillo, CA (US); Changsoo S. Jeong, Rancho Palos, CA (US)

(73) Assignee: HRL Laboratories, LLC, Malibu, CA (US)

( * ) Notice: Subject to any disclaimer, the term of this patent is extended or adjusted under 35 U.S.C. 154(b) by 224 days.

(21) Appl. No.: 13/967,227

(22) Filed: Aug. 14, 2013

Related U.S. Application Data

(60) Provisional application No. 61/784,878, filed on Mar. 14, 2013.

(51) Int. Cl.
  *G06K 9/34* (2006.01)
  *G06T 7/00* (2006.01)
(52) U.S. Cl.
  CPC .................................. *G06T 7/0079* (2013.01)
(58) Field of Classification Search
  None
  See application file for complete search history.

(56) References Cited

PUBLICATIONS

Chen, Yang, et al. "A neuromorphic approach to object detection and recognition in airborne videos with stabilization." Advances in Visual Computing. Springer Berlin Heidelberg, 2011. 126-135.*
Bogdan Alexe, Thomas Deselaers, Vittorio Ferrai, "What is an object?" in Proc. of CVPR 2010, pp. 73-80.
Russakovsky, O. and Ng, A.Y. "A Steiner tree approach to efficient object detection", in Proc. of CVPR 2010, pp. 1070-1077.
C.H. Lampert, M.B. Blaschko and T. Hofmann, "Beyond sliding windows: Object localization by efficient subwindow search,", in Proc. of CVPR, 2008.
Y. Owechko and S. Medasani, "A swarm-based volition/attention framework for object recognition," in Proc. of CVPR workshop, 2005.

(Continued)

*Primary Examiner* — Bhavesh Mehta
*Assistant Examiner* — Andrew Moyer
(74) *Attorney, Agent, or Firm* — Tope-McKay & Associates

(57) ABSTRACT

Described is a system for rapid object detection combining structural information with bio-inspired attentional mechanisms. The system oversegments an input image into a set of superpixels, where each superpixel comprises a plurality of pixels. For each superpixel, a bounding box defining a region of the input image representing a detection hypothesis is determined. An average residual saliency (ARS) is calculated for the plurality of pixels belonging to each superpixel. Each detection hypothesis that is out of a range of a predetermined threshold value for object size is eliminated. Next, each remaining detection hypothesis having an ARS below a predetermined threshold value is eliminated. Then, color contrast is calculated for the region defined by the bounding box for each remaining detection hypothesis. Each detection hypothesis having a color contrast below a predetermined threshold is eliminated. Finally, the remaining detection hypotheses are output to a classifier for object recognition.

12 Claims, 7 Drawing Sheets

(56) References Cited

PUBLICATIONS

Xiadoi Hou, et al., "Saliency detection: A spectral residual approach", in Proc. of CVPR, 2007, pp. 1-8.
A. Vedaldi and S. Soatto, Quick Shift and Kernel Methods for Mode Seeking, in Proceedings of the European Conference on Computer Vision (ECCV), 2008.
Shital Adarsh Raut, M. Raghuwanshi, R. Dharaskar, and Adarsh Raut. 2009. Image Segmentation—A State-Of-Art Survey for Prediction. In Proceedings of the 2009 Interntional Conference on Advanced Computer Control (ICACC '09). IEEE Computer Society, Washington, DC, USA, 420-424.
Parzen, E. (1962). "On Estimation of A Probability Density Function and Mode". The Annals of Mathematical Statistics 33 (3): 1065.
Adrian Ford and Alan Roberts, Colour Space Conversions, Aug. 11, 1998.

* cited by examiner

RAPID OBJECT DETECTION BY
COMBINING STRUCTURAL INFORMATION
FROM IMAGE SEGMENTATION WITH
BIO-INSPIRED ATTENTIONAL
MECHANISMS

GOVERNMENT LICENSE RIGHTS

This invention was made with government support under U.S. Government Contract Number HR0011-10-C-0033 Neovision2. The government has certain rights in the invention.

CROSS-REFERENCE TO RELATED APPLICATIONS

This is a Non-Provisional patent application of U.S. Provisional Application No. 61/784,878, filed in the United States on Mar. 14, 2013, entitled, "Rapid Object Detection by Combining Structural Information from Image Segmentation with Bio-Inspired Attentional Mechanisms."

BACKGROUND OF THE INVENTION (1) Field of Invention

The present invention relates to a system for rapid object detection and, more particularly, to a system for rapid object detection that combines structural information from image segmentation with bio-inspired attentional mechanisms.

(2) Description of Related Art

Object detection and recognition has been studied in the computer vision domain for many years. In the object detection domain, sliding windows and saliency ("object-ness") are traditionally used for finding candidates of objects. The sliding window based approach typically requires a large amount of computation, since there are many windows to test. Many works exhaustively search over the entire image region at different locations, scales, and orientations. This can significantly slow down the object detection algorithm. This computational problem is often more serious for high-dimensional problems and real-time applications. Recently, there have been efforts in improving the searching approach given the initial candidates (also referred to as hypotheses). Efficient sliding-windows search (ESS) (see the List of Cited Literature References, Literature Reference No. 3) and particle swarm optimization (PSO) (see Literature Reference No. 4) are shown to improve the speed of finding objects from those initial candidates. Nevertheless, ESS and PSO approaches focus on improving the searching stage, but do not improve the initial detection of candidates. Moreover, they usually require an iterative processing and can be significantly slowed down for images containing many objects.

On the other hand, saliency based approaches typically focus attention on image areas with high saliency. Such approaches are usually more computationally efficient, but suffer from the difficulty of defining a generic saliency metric (see Literature Reference No. 1).

A recent publication by Russakovsky and Ng (see Literature Reference No. 2) used a graph-based image segmentation approach to generate initial candidates. Their technique required a training stage to find the optimal set of parameters for their five-step sequential processing. Moreover, experiments were performed with small size images in less complex scenarios.

Each of the prior methods described above exhibit limitations that make them incomplete. Thus, a continuing need exists for an object detection system which does not have a time consuming training stage, can be used for wide-view aerial images, and uses fast image segmentation with attention based features for simple, efficient, and accurate object detection.

SUMMARY OF THE INVENTION

The present invention relates to a system for rapid object detection and, more particularly, to a system for rapid object detection that combines structural information from image segmentation with bio-inspired attentional mechanisms. The system comprises one or more processors and a memory having instructions such that when the instructions are executed, the one or more processors perform multiple operations. First, an input image is oversegmented into a set of superpixels, where each superpixel comprising a plurality of pixels. For each superpixel, a bounding box is determined that defines a region of the input image representing a detection hypothesis. For each superpixel, an average residual saliency (ARS) is calculated for the plurality of pixels belonging to the superpixel. Each detection hypothesis that is out of a range of a predetermined threshold value for object size is then eliminated, resulting in a first set of remaining detection hypotheses. Each remaining detection hypothesis in the first set of remaining detection hypotheses having an ARS below a predetermined threshold value is eliminated, resulting in a second set of remaining detection hypotheses. For each remaining detection hypothesis in the second set of remaining detection hypotheses, color contrast is calculated for the region defined by the bounding box, and each detection hypothesis in the second set of remaining detection hypotheses having a color contrast below a predetermined threshold value is eliminated, resulting in a third set of remaining detection hypotheses. The third set of remaining detection hypotheses is output to a classifier for object recognition.

In another aspect, quick-shift image segmentation is used for oversegmenting the input image.

In another aspect, a spectral residual saliency map for the input image is calculated, wherein the spectral residual saliency map is used to calculate the ARS for the plurality of pixels within each superpixel.

In another aspect, color contrast is calculated as follows:

$$CC(w,S)=\chi^2(h(w),h(S)),$$

where CC denotes color contrast, w denotes a bounding box in a detection hypothesis, S is a rectangular ring surrounding w, and h( ) denotes a histogram of color.

As can be appreciated by one skilled in the art, the present invention also comprises a method for causing a processor to perform the operations described herein.

Finally, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
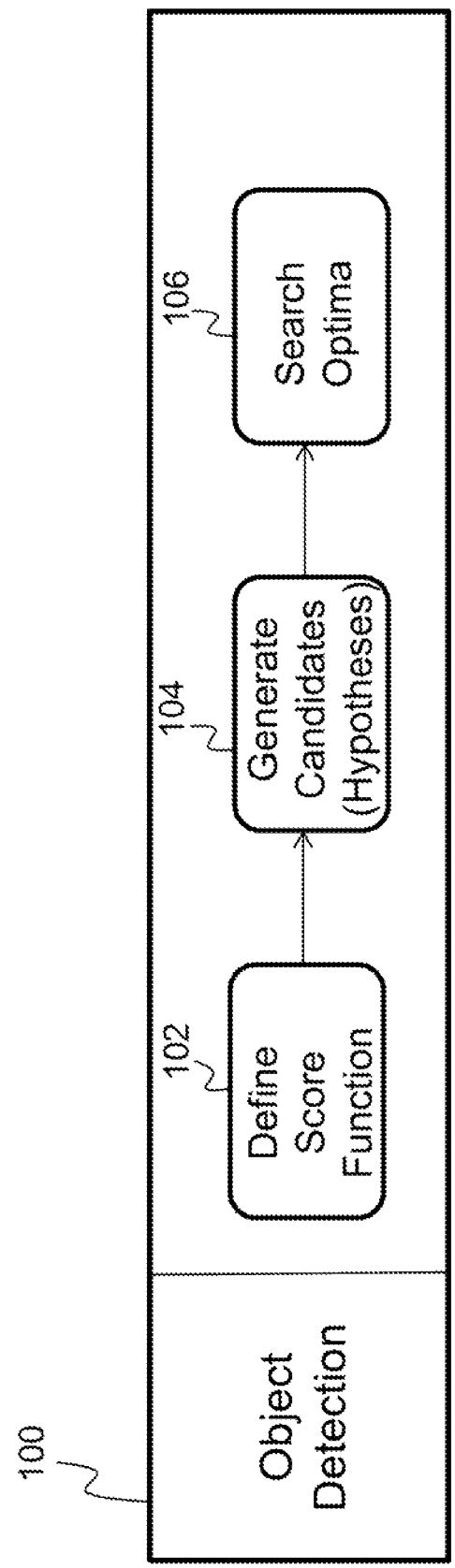
FIG. 1 is an illustration of components of a typical object detection system according to principles of the present invention.

The present invention relates to a system for rapid object detection and, more particularly, to a system for rapid object detection that combines structural information from image segmentation with bio-inspired attentional mechanisms. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention.

However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) LIST OF CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Bogdan Alexe, Thomas Deselaers, Vittorio Ferrari, "What is an object?" in Proc. of CVPR 2010, pp. 73-80.
2. Russakovsky, O. and Ng, A. Y. "A Steiner tree approach to efficient object detection", in Proc. of CVPR 2010, pp. 1070-1077.
3. C. H. Lampert, M. B. Blaschko and T. Hofmann, "Beyond sliding windows: Object localization by efficient subwindow search", in Proc. of CVPR, 2008.
4. Y. Owechko and S. Medasani, "A swarm-based volition/attention framework for object recognition," in Proc. of CVPR workshop, 2005.
5. Xiaodi Hou, Liqing Zhang, "Saliency detection: A spectral residual approach", in Proc. of CVPR, 2007, pp. 1-8.
6. A. Vedaldi and S. Soatto, Quick Shift and Kernel Methods for Mode Seeking, in Proceedings of the European Conference on Computer Vision (ECCV), 2008.
7. Shital Adarsh Raut, M. Raghuwanshi, R. Dharaskar, and Adarsh Raut. 2009. Image Segmentation—A State-Of-Art Survey for Prediction. In Proceedings of the 2009 International Conference on Advanced Computer Control (ICACC '09). IEEE Computer Society, Washington, D.C., USA, 420-424.
8. Parzen, E. (1962). "On Estimation of a Probability Density Function and Mode". The Annals of Mathematical Statistics 33 (3): 1065.
9. Adrian Ford and Alan Roberts, Colour Space Conversions, Aug. 11, 1998.

(2) PRINCIPAL ASPECTS

The present invention has three "principal" aspects. The first is a system for rapid object detection. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for rapid object detection. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) INTRODUCTION

Object detection and recognition have been studied in the computer vision domain for many years. Generating detection candidates is a critical initial step for object detection and recognition. Currently, sliding windows and saliency based approaches are the most widely used approaches for generating detection hypotheses (i.e., potential locations for object detection and recognition). The sliding window based approach requires exhaustive search of a huge number of candidates, which is often very time consuming. In contrast, the saliency based approach is often computationally more efficient, since it limits its attention to only image areas with high saliency. However, it requires defining a robust and generic saliency metric, which is usually a practice of art.

Recently there have been efforts in improving the searching approach given the initial candidates (also referred to as hypotheses). Efficient sliding-windows search (ESS)(see Literature Reference No. 3) and particle swarm optimization (PSO) (see Literature Reference No. 4) are shown to improve the speed of finding objects from those initial candidates. Nevertheless, ESS and PSO approaches focus on improving the searching stage, but do not improve the initial detection of candidates. Moreover, they usually require an iterative processing and can be significantly slowed down for images containing many objects.

Instead of improving the searching stage, the present invention focuses on improving the early stage of generating detection hypotheses. The present invention describes a simple and effective architecture for rapidly generating detection hypotheses by combining efficient image segmentation with generic bio-inspired saliency measurements. It allows using any generic image segmentation approach to generate the initial hypotheses and using any saliency measurements to quickly reject inappropriate hypotheses to finalize the set of candidates for following classification process.

Furthermore, the present invention has multiple advantages over the aforementioned traditional approaches including fast generation of initial candidates using efficient quickshift segmentation; effective removal of false alarms using saliency measurements, including residual saliency and color contrast; leveraging of easy-to-get prior knowledge about object geometric information (e.g., size ranges) to further reduce false alarms; classifier independence; and non-iterative processing compared to statistical searching based approaches.

In a desired aspect of the present invention, a fast quickshift image segmenter (see Literature Reference No. 6) is used to over-segment the input image to generate the initial candidates. Spectral residual saliency, color contrast, and other available constraints (e.g., geometric constraints) are then applied to reduce false alarms while maximally preserving true positive detections, which mimics a human's attention-based object detection and recognition process. These components together quickly generate a set of detection candidates with high detection rates and reasonable false alarms. These processes can be combined with any object-specific classifier to solve object recognition tasks. One implementation of the present invention was tested on aerial imagery data. As will be described below, the results demonstrated that the approach could quickly and effectively generate detection candidates with high accuracy.

(4) SPECIFIC DETAILS

The goal of object detection and recognition is to find objects of interest in an input image and determine each object's locations (i.e., detection) and object class (i.e., classification). An object detection system 100 consists of several components, as shown in FIG. 1. First, a scoring function needs to be defined (define score function 102) that can produce a confidence score about how likely an object of interest exists in a given location. Second, another component should be able to generate some candidate image positions, or hypotheses, (generate candidates (hypotheses) 104) to test if there are objects. An ideal method will generate as small a number as possible of hypotheses but cover all objects of interest in the image. In practice, there is always a trade-off between positive detections (PDs) and false alarms (FAs). Once the scoring function is defined (define score function 102) and the hypotheses are generated (generate candidates (hypotheses) 104), the third component, an efficient searching method, will quickly test the detection scores on those hypotheses (search optima 106). Usually the optima of detection scores correspond to the most likely positions of objects.

Figure 2:
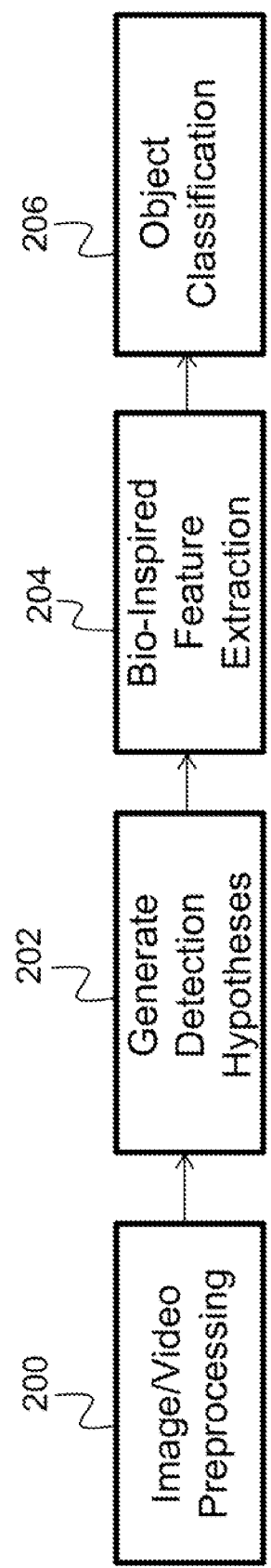
FIG. 2 is an illustration of typical work flow for object detection and recognition tasks according to principles of the present invention.

Object detection is also an early step in object recognition. FIG. 2 illustrates a typical work flow for object detection and recognition. The input image/video is first processed by pre-processing steps (image/video preprocessing 200), non-limiting examples of which include image enhancement, image filtering, video stabilization, and denoising. Next, objects of interests are detected in sparse locations within the images (generate detection hypotheses 202). In order to know the object class information, discriminative features (e.g., bio-inspired features) are extracted from the local image patches around the detections (bio-inspired feature extraction 204), and a classifier performs classification given these features to identify the object class (object classification 206).

The present invention specifically focuses on how to efficiently and effectively generate detection hypotheses (FIG. 1, 104; FIG. 2, 202). Specifically, the present invention combines conventional image segmentation with a bio-inspired saliency map to quickly and effectively generate detection hypotheses that have high positive detection rates and reasonable false alarms. These detection hypotheses can be fed into the classification component to finalize the object detection and recognition. The system is much more efficient than the widely used sliding window approaches that exhaustively search over a large number of overlapping windows across the whole image. The architecture is also general enough to allow using any generic image segmentation approach (e.g., normalized-cuts segmentation, watershed segmentation) and saliency measurements to achieve the same goal.

Figure 3:
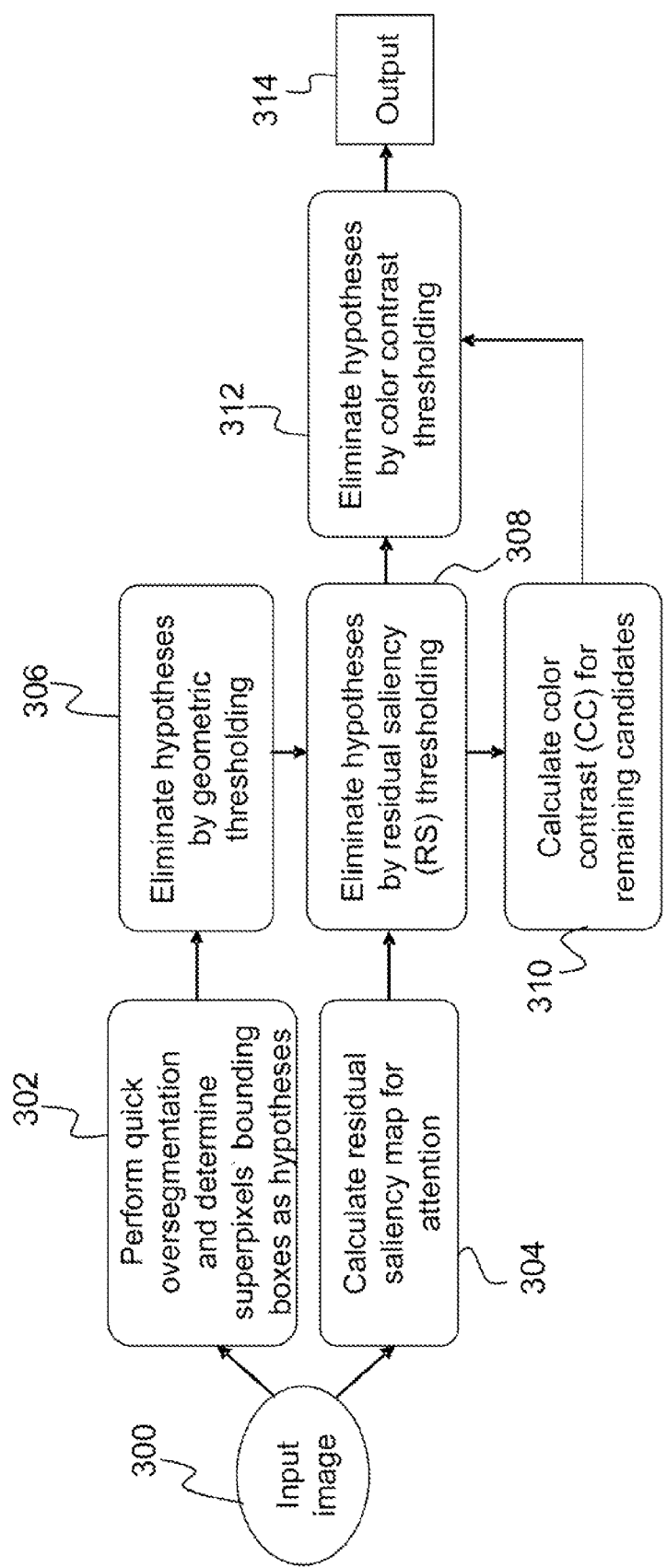
FIG. 3 is a flow diagram illustrating the attention based system for rapidly generating detection hypotheses according to principles of the present invention.

FIG. 3 is a block diagram of one embodiment of the present invention. Given an input image 300, the image is first over-segmented using a traditional image segmentation approach. Oversegmentation refers to segmenting an image so that the likelihood of multiple objects grouped within one segment is minimized. In a first step 302, the system oversegments the image into a set of constituent regions, also referred to as superpixels. In this embodiment and as a non-limiting example of a segmentation approach, fast quick-shift image segmentation (see Literature Reference No. 6) was used for segmentation. The minimal bounding box that encloses each superpixel becomes an initial hypothesis region for classification. The bounding box is defined by its width, height, and its centroid location.

In a second step 304, the spectral residual saliency map for attention corresponding to the input image is calculated. For each superpixel, the average residual saliency (ARS) (see Literature Reference No. 5) for all pixels belonging to the superpixel is calculated.

In a third step 306, hypotheses from the first step 302 are checked with their structural information to reject hypotheses that are out of the range of object sizes. In other words, hypotheses are eliminated based on geometric thresholding. In general, any prior information about the object's geometry, such as sizes and aspect ratio, is used and the hypotheses that are out of the typical range of these geometric data are removed.

In a fourth step 308, each ARS from the second step 304 is then thresholded to reject any hypothesis whose ARS is below the threshold, thereby eliminating hypotheses by residual saliency (RS) thresholding (see Literature Reference No. 5), which is thresholding based on a predefined threshold value. For each remaining hypothesis, the color contrast (CC) (see Literature Reference No. 1) for the region defined by the bounding box is calculated in a fifth step 310. In a sixth step 312, the hypotheses are again thresholded to reject any hypothesis whose CC is below the threshold value, thereby eliminating hypotheses by color contrast thresholding. After all of the aforementioned steps/processes have been performed, the remaining hypotheses are accepted and output 314. The output 314 could be given to any classifier for completing object recognition tasks. Additional details for each critical component in the system are described below.

(4.1) Image Oversegmentation

Initial detection hypotheses are generated by performing oversegmentation using image segmentation methods. Image oversegmentation is represented by the first step 302 in FIG. 3. This approach is in contrast to the sliding window based approaches that use spatially uniformly distributed overlapping windows as detection hypotheses. In principle, any generic image segmentation method can be used for this purpose, non-limiting examples of which include quick-shift segmentation, graph-based image segmentation, watershed segmentation, mean-shift segmentation, and normalized-cuts (see Literature Reference No. 7). These image segmentation methods can partition an input image into constituent regions, each of which is a small portion of the image and is usually homogeneous enough to be assigned with one class label.

Since there is no universally best image segmentation method, choosing an appropriate segmentation approach depends on several factors including, but not limited to, computational efficiency, memory usage, accuracy, flexibility of controlling image segmentation, and difficulty of parameter tuning. In the current embodiment of the bio-inspired attention based system of the present invention, the fast quick-shift image segmentation method was utilized for several reasons. First, it is computationally efficient and very fast. Second, it does not consume a significant amount of memory. Third, it has very few parameters to tune. Finally, it can generate multiscale image segmentation by only changing one parameter without restarting the main computation.

The quick-shift segmentation method is a kind of fast mode seeking approach that moves each pixel to the mode (i.e., a maximum) of a density distribution. For each pixel at (x,y)

location, let I(x,y) denote the color information at this pixel. Quick-shift estimates a probability density of the joint spatial and color vector space using the Parzen window methods (see Literature Reference No. 8) with a Gaussian kernel according to the following:

$$P(x, y, I(x, y)) = \sum_{x',y'} \frac{1}{(2\pi\sigma)^{d+2}} \exp\left(\frac{-1}{2\sigma^2}\begin{bmatrix} x-x' \\ y-y' \\ I(x,y)-I(x',y') \end{bmatrix}\right),$$

where (x',y') corresponds to pixel locations within the Parzen window, and d is the dimension of color space. σ is the standard deviation of a Gaussian kernel.

Quick-shift organizes all pixels in an image based on a distance (dissimilarity) function that measures the dissimilarity between two pixels at (x,y) and (x',y') as follows:

$$\text{dist}((x,y),(x',y'))=(x-x')^2+(y-y')^2+\lambda\|I(x,y)-I(x',y')\|_2^2,$$

where λ is a parameter to balance the weights between spatial distance and color space distance. Specifically, each pixel (x,y) is connected to its closest neighbor according to the above distance metric that has a higher density value as follows:

$$(x',y')^* = \text{argmin}_{(x',y')}\text{dist}((x,y),(x',y')),$$

subject to $P(x',y')>P(x,y)$.

In this way, all pixels can be organized in a forest of hierarchical trees. This organization is illustrated in the hierarchical tree 400 in FIG. 4, where each pixel is represented by a circle. Each pixel is connected with another pixel that is closest according to the defined distance function and has a greater density value (i.e., density value increased). Along the hierarchical tree 400, the distance between a pair of pixels is monotonically increased (i.e., pairwise distance increased). Gradually, a set of pixels can be connected into one tree when the farthest pixel is connected. If there are multiple modes, multiple hierarchical trees are constructed and form a forest of trees. In the end, the forest of trees contains all pixels in the image.

Figure 4:
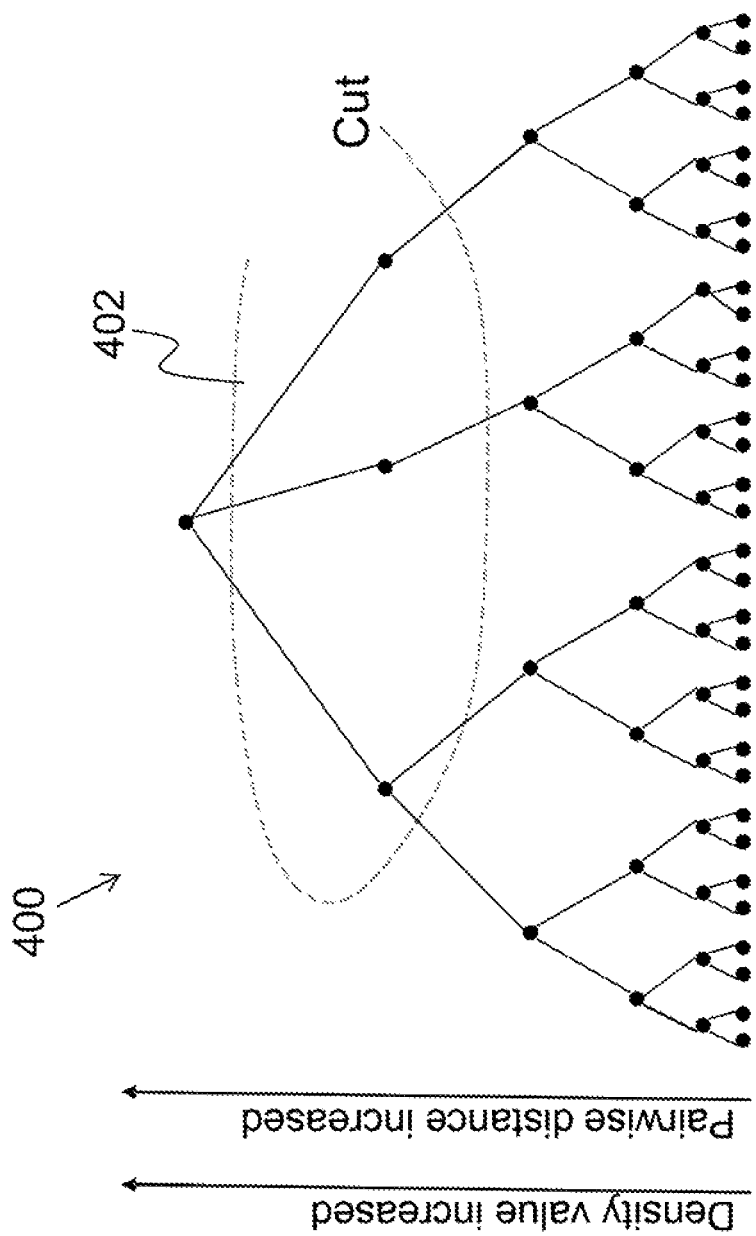
FIG. 4 is an illustration of cutting of a hierarchical organization tree of all pixels to oversegment an image according to principles of the present invention.

From the bottom layer to the top layer in each tree, the distance (dissimilarity) between pixels is increased and the density value is also increased, as indicated by the arrows in FIG. 4 labeled "Density value increased" and "Pairwise distance increased." A threshold of the maximum distance between pairwise pixels can be set to cut the tree into multiple branches, as illustrated by the dotted line 402 in FIG. 4. Each branch contains a cluster of pixels that have pairwise distance lower than the threshold. In other words, the pixels in each cluster are "similar" to each other to the level set by the threshold (or the maximum distance). In the end, each cluster of pixels forms a superpixel in the oversegmentation produced by quick-shift segmentation. The set of branches after cut generate the entire oversegmentation of the input image.

After oversegmentation, the whole image is partitioned into a large set of superpixels, while each superpixel is relatively homogeneous and most likely belongs to one object. These raw superpixels will be further processed by the following steps described below to quickly generate the set of detection hypotheses for object classification.

(4.2) Generation of Initial Hypotheses

The superpixel in an oversegmentation can be of any arbitrary shape. However, most popular feature extraction approaches still prefer to work on rectangular image patches (i.e., windows). In order to easily integrate with these feature extraction processes, the present invention generates rectangular detection hypotheses. Given an arbitrary superpixel, its minimum bounding box that encloses the entire superpixel region as its hypothesis is extracted. The set of bounding boxes for all superpixels in the oversegmentation forms the set of initial detection hypotheses that are ready for the following processing to refine the hypotheses.

(4.3) Refinement of Detection Hypotheses

The initial set of detection hypotheses are usually over complete. That is, there are many false alarm hypotheses that actually contain no objects of interest. Existence of too many false alarms will make the task of classification difficult. This is because it will require that the classifier has very low false alarm performance, which is practically not easy to achieve due to the trade-off of positive detection and false alarms. To alleviate this problem, some readily available information is leveraged, especially bio-inspired attention measurements, such as spectral residual saliency and color contrast, to quickly reject hypotheses that most likely contain no objects.

(4.3.1) Geometric Thresholding

Geometric thresholding is represented by the third step 306 in FIG. 3. For a known class of objects, it is typically feasible to know the range of their geometric sizes either by a priori knowledge or by rough estimation of their structural information. For example, one can roughly estimate the size of cars if the distance from the objects to the camera and the view angle are known and not changing significantly. Such information can be used to quickly reject detection hypotheses that are out of the typical range of object sizes. In the present invention, a thresholding of the width and height of the detection hypothesis is used for this purpose. Any detection hypothesis will be rejected when either of its dimensions is out of its distribution range. This process can eliminate those hypotheses that are either too big or too small.

(4.3.2) Residual Saliency Thresholding

More importantly, attention-based saliency measurements are leveraged to further refine the detection hypotheses. This process is inspired by biology, since humans often examine an image by attention. Humans can quickly concentrate on those objects that pop out from the background (i.e., objects with high saliency). The present invention mimics the human bio-system and uses generic saliency map information to reject false alarm hypotheses.

In principle, any generic saliency measurements can be leveraged in the system described herein as long as they provide a score that measures the saliency level. There is a large set of literature defining various types of saliency measurements. In one aspect of the present invention, two saliency measurements are implemented, spectral residual saliency and color contrast, for refining the set of detection hypotheses. Below is a description of how to calculate a spectral residual saliency map, which is represented by the second step 304 in FIG. 3.

For each input image, the image is first filtered with a low-pass isotropic Gaussian filter by image convolution. This pre-process can smooth the image and reduce image artifacts. The filtered image is then downsampled to improve the computational efficiency of following processing. Image enhancement is applied on the downsampled image to increase the contrast of targets of interest. This is achieved by convolving the image with an un-normalized Gaussian function with the target color as the mean. The image area with similar color as the target will have high response, and its contrast will be boosted. If there are multiple modes of target color, multiple channels of maps may be generated by this process.

The resulting maps are then used to calculate a saliency map using an approach for calculating spectral residual saliency. The spectral residual R(f) of an image f is defined as:

$$R(f)=L(f)-A(f),$$

where L(f) is the log spectrum of the image and A(f) is the averaged spectrum that can be approximated by convoluting L(f) with an average filter.

The spectral residual saliency map S(x) is finally calculated by inverse Fourier transform smoothed by a Gaussian filter, such as follows:

$$S(x)=g(x)*\mathcal{F}^{-1}[\exp(R(f)+P(f))],$$

where x is the pixel location and g(x) denotes a Gaussian smoother filter. $\mathcal{F}^{-1}$ is the inverse Fourier transform, and P(f) is the phase spectrum of the image after Fourier transform.

Using image convolution, fast Fourier transform, and inverse Fourier transform, a residual saliency map is calculated using the above equations. The residual saliency map is then used to calculate the average residual saliency for all pixels within each superpixel. This gives a metric that generally measures the saliency of the superpixel. A threshold is set for the metric to reject any detection hypothesis whose average residual saliency is below the threshold value. This step of residual saliency thresholding can eliminate many false alarm hypotheses, as represented by the fourth step 308 in FIG. 3.

(4.3.3) Color Contrast Thresholding

In addition to the residual saliency map, another saliency measurement (i.e., color contrast) is calculated for further refining the set of detection hypotheses, which is represented by the fifth step 310 in FIG. 3. Color contrast is a local measurement of the dissimilarity of an image patch to its adjacent surrounding area. For example, let w denote the bounding box in a detection hypothesis and S be a rectangular ring surrounding w by enlarging w by a factor in all four directions. The CIE 1976 (L*, a*, b*) color space (hereinafter referred to as CIELAB color) (see Literature Reference No. 9) histograms within both the window w and its surrounding ring S are calculated. The Chi-square distance between two histograms is defined as the color contrast (CC) measurement as follows:

$$CC(w,S)=\chi^2(h(w),h(S)),$$

where h( ) denotes the histogram of CIELAB color within the region, w or S. $\chi^2$ distance is used to measure the "difference/dissimilarity" between two histograms h(w) and h(S).

$$CC(w, S) = \chi^2(h(w), h(S)) = \frac{\sum_{i=1}^{M} [(hw_i - hS_i)^2 / (hw_i + hS_i)]}{2.0},$$

where M is the number of histogram bins. The normalized histogram h(w) is a vector of $[hw_1, hw_2, \ldots, hw_i, \ldots, hw_M]$ and h(S) is a vector of $[hS_1, hS_2, \ldots, hS_i, \ldots, hS_M]$.

The intuition of using color contrast as a saliency measurement is that an object is usually different from its surrounding background. The histograms between a window w and its surrounding area S, therefore, should be different, which can be measured by the Chi-square distance. A threshold of color contrast is set to further eliminate detection hypotheses if their CC measurements are below the threshold value, as represented by the sixth step 312 in FIG. 3. This step is used to further reduce false alarms. Finally, besides the saliency measurements used in the current embodiment of the present invention, other generic saliency measurements are similarly applicable to the system.

(4.4) Experimental Studies

All of the above processes were implemented in one embodiment of the described system and tested on a sequence of 100 aerial images. The results indicated that the detection boxes covered most of the objects of interest (i.e., cars) in the sequence, and there were about 1000 false alarm hypotheses per image. The final detection hypotheses can be input into any traditional classification system such as Support Vector Machines (SVMs), decision forest, or convolutional neural networks (CNNs) to perform object classification. Typically, these classification systems have low false alarm rates and can eliminate most of the background in these detection hypotheses.

Figure 5:
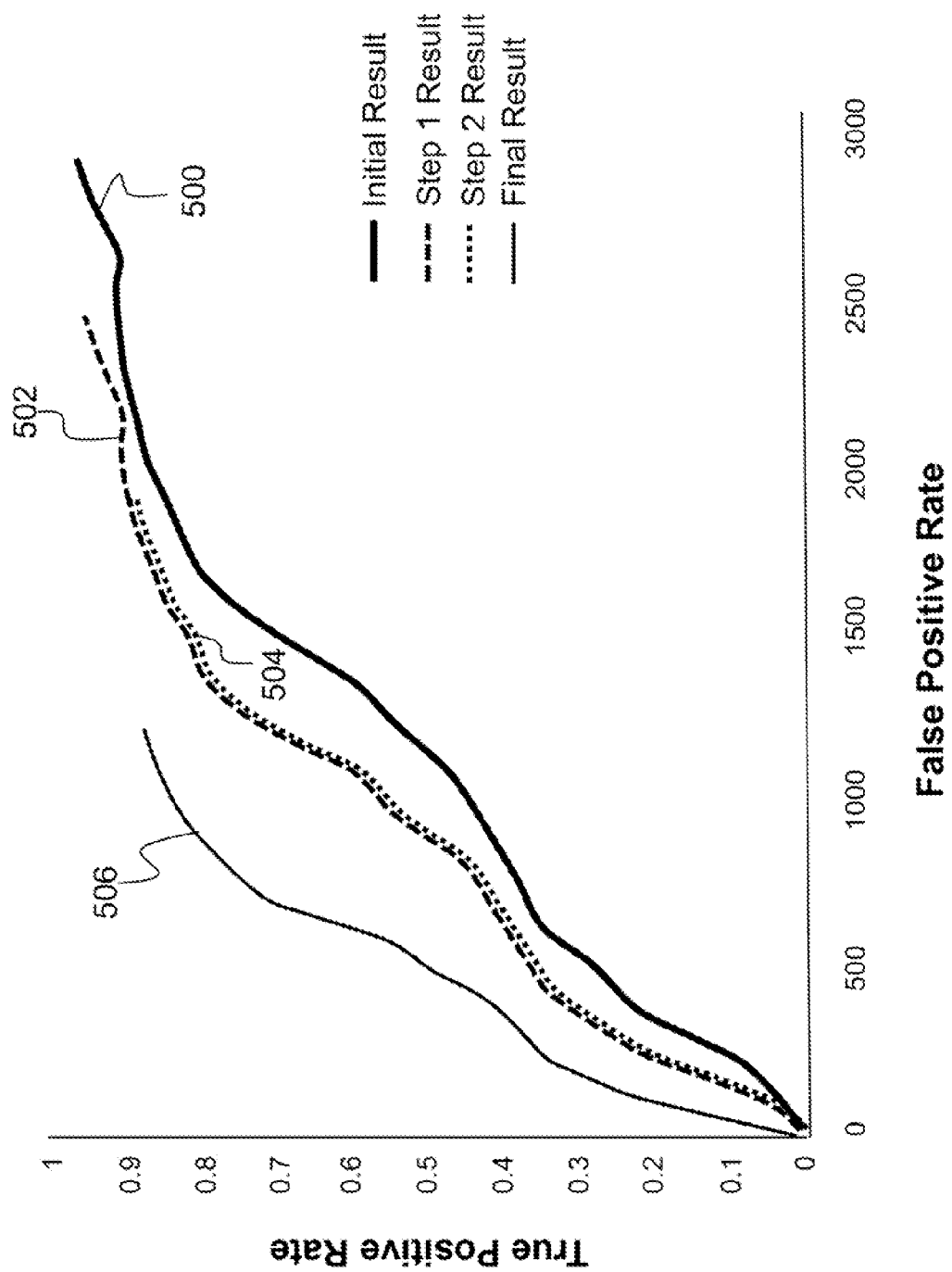
FIG. 5 is a plot of receiver operating characteristic (ROC) curves for a set of experiments that sequentially added more processes to refine the set of detection hypotheses according to principles of the present invention.

To demonstrate the effectiveness of the aforementioned processes for eliminating false alarms, the ROC curves of the detection hypotheses with respect to the groundtruth detection boxes were calculated. Specifically, each process was gradually added to further refine the set of detection hypotheses. FIG. 5 shows the set of ROC curves from these experiments.

The initial set of hypotheses, represented by curve 500, generated by original quick-shift oversegmentation consisted of approximately 2955 detections. The detections included most (96.02%) of the objects of interest in these images, but also many hypotheses corresponded to background areas and are false alarms. After the geometric thresholding process was applied (i.e., Step 1), the number of false alarms was reduced to 2478, as represented by curve 502. The positive detection rate was just slightly reduced from 96.02% to 95.26%. However, there were still many false alarms in the remaining set of detection hypotheses. Next, the residual saliency thresholding process was added (i.e., Step 2). The false alarms were further reduced from 2478 to 1930, as represented by curve 504. The positive detection rate was reduced from 95.26% to 89.8%. Finally, the process of color contrast thresholding was added. The false alarms were again reduced from 1930 to 1241, and the positive detection rate was marginally changed (about 2%), as represented by curve 506. This set of experiments demonstrated the effectiveness of each process for reducing false alarms while maximally retaining the true object detection.

Finally, the system described herein is general enough to be used with any general image segmentation method for oversegmentation and any generic saliency measurements for removing false alarms. It can quickly and effectively generate a set of detection hypotheses that can be used by any object classification system. In addition, there are also many potential ways to extend the described system to improve its performance. For example, one can set multiple maximal distances to cut the trees in quick-shift segmentation. Since the maximal distance is correlated to the maximum superpixel in an oversegmentation, using multiple cuts of trees can simulate multi-scale image segmentation. This can be useful when the scales of objects change significantly in the image. In addition, if other a priori knowledge is known about the objects of interest, such as their aspect ratios and shapes, the information can be readily added into the system to further reduce false alarms. In general, the more knowledge known about targets, the more refinement one can make to the set of detection hypotheses.

Figure 6:
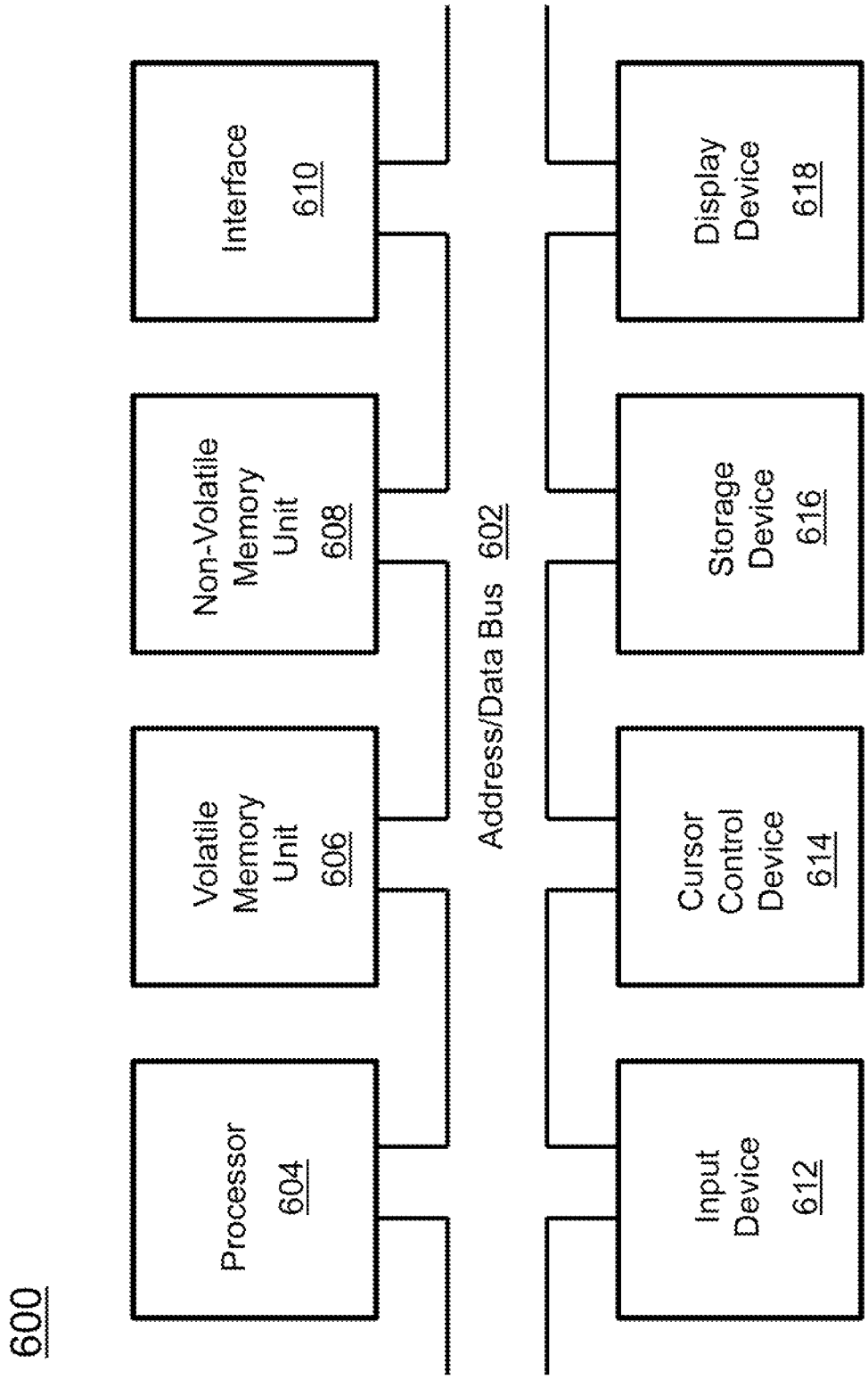
FIG. 6 is an illustration of a data processing system according to principles of the present invention.

An example of a computer system 600 in accordance with one aspect is shown in FIG. 6. The computer system 600 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 600. When executed, the instructions cause the computer system 600 to perform specific actions and exhibit specific behavior, such as described herein.

The computer system 600 may include an address/data bus 602 that is configured to communicate information. Additionally, one or more data processing units, such as a processor 604, are coupled with the address/data bus 602. The processor 604 is configured to process information and instructions. In one aspect, the processor 604 is a microprocessor. Alternatively, the processor 604 may be a different type of processor such as a parallel processor, or a field programmable gate array.

The computer system 600 is configured to utilize one or more data storage units. The computer system 600 may include a volatile memory unit 606 (e.g., random access memory ("RAM"), static RAM, dynamic RAM, etc.) coupled with the address/data bus 602, wherein a volatile memory unit 606 is configured to store information and instructions for the processor 604. The computer system 600 further may include a non-volatile memory unit 608 (e.g., read-only memory ("ROM"), programmable ROM ("PROM"), erasable programmable ROM ("EPROM"), electrically erasable programmable ROM ("EEPROM"), flash memory, etc.) coupled with the address/data bus 602, wherein the non-volatile memory unit 608 is configured to store static information and instructions for the processor 604. Alternatively, the computer system 600 may execute instructions retrieved from an online data storage unit such as in "Cloud" computing. In an embodiment, the computer system 600 also may include one or more interfaces, such as an interface 610, coupled with the address/data bus 602. The one or more interfaces are configured to enable the computer system 600 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 600 may include an input device 612 coupled with the address/data bus 602, wherein the input device 612 is configured to communicate information and command selections to the processor 600. In accordance with one aspect, the input device 612 is an alphanumeric input device, such as a keyboard, that may include alphanumeric and/or function keys. Alternatively, the input device 612 may be an input device other than an alphanumeric input device. In one aspect, the computer system 600 may include a cursor control device 614 coupled with the address/data bus 602, wherein the cursor control device 614 is configured to communicate user input information and/or command selections to the processor 600. In one aspect, the cursor control device 614 is implemented using a device such as a mouse, a track-ball, a track-pad, an optical tracking device, or a touch screen. The foregoing notwithstanding, in one aspect, the cursor control device 614 is directed and/or activated via input from the input device 612, such as in response to the use of special keys and key sequence commands associated with the input device 612. In an alternative aspect, the cursor control device 614 is configured to be directed or guided by voice commands.

In one aspect, the computer system 600 further may include one or more optional computer usable data storage devices, such as a storage device 616, coupled with the address/data bus 602. The storage device 616 is configured to store information and/or computer executable instructions. In one aspect, the storage device 616 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 618 is coupled with the address/data bus 602, wherein the display device 618 is configured to display video and/or graphics. In one aspect, the display device 618 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 600 presented herein is an example computing environment in accordance with one aspect. However, the non-limiting example of the computer system 600 is not strictly limited to being a computer system. For example, one aspect provides that the computer system 600 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 7:
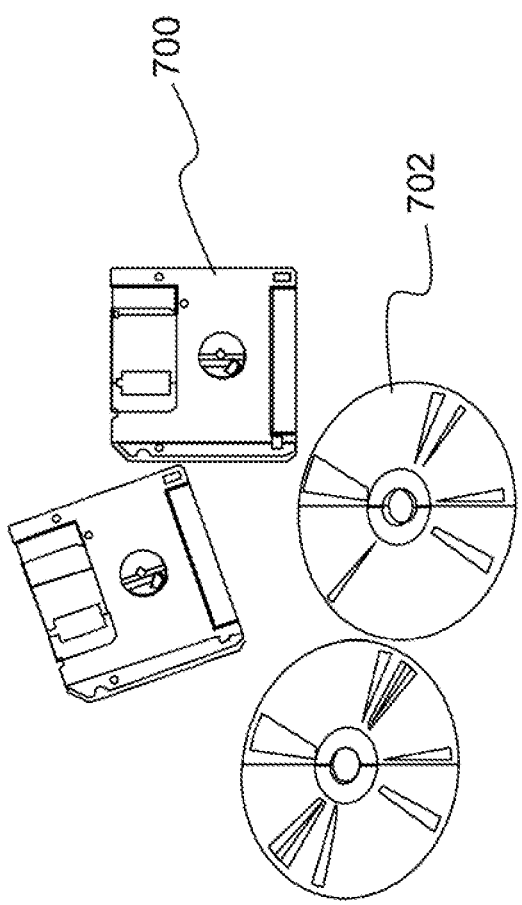
FIG. 7 is an illustration of a computer program product according to principles of the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer readable code (i.e., instruction means or instructions) stored on any compatible non-transitory computer readable medium.

What is claimed is:

1. A system for rapid object detection, the system comprising:
   one or more processors and a non-transitory memory having instructions encoded thereon such that when the instructions are executed, the one or more processors perform operations of:
   oversegmenting an input image into a set of superpixels, each superpixel comprising a plurality of pixels;
   determining, for each superpixel, a bounding box defining a region of the input image representing a detection hypothesis;
   calculating, for each superpixel, an average residual saliency (ARS) for the plurality of pixels belonging to the superpixel;
   eliminating each detection hypothesis that is out of a range of a predetermined threshold value for object size, resulting in a first set of remaining detection hypotheses;
   eliminating each remaining detection hypothesis in the first set of remaining detection hypotheses having an ARS below a predetermined threshold value, resulting in a second set of remaining detection hypotheses;
   calculating, for each remaining detection hypothesis in the second set of remaining detection hypotheses, color contrast for the region defined by the bounding box, and eliminating each detection hypothesis in the second set of remaining detection hypotheses having a color contrast below a predetermined threshold value, resulting in a third set of remaining detection hypotheses; and
   outputting the third set of remaining detection hypotheses to a classifier for object recognition.

2. The system as set forth in claim 1, wherein the one or more processors further perform an operation of using quick-shift image segmentation for oversegmenting the input image.

3. The system as set forth in claim 1, wherein the one or more processors further perform an operation of calculating a spectral residual saliency map for the input image, wherein the spectral residual saliency map is used to calculate the ARS for the plurality of pixels within each superpixel.

4. The system as set forth in claim 1, wherein the one or more processors further perform an operation of calculating color contrast as follows:

$$CC(w,S)=\chi^2(h(w),h(S)),$$

where CC denotes color contrast, w denotes a bounding box in a detection hypothesis, S is a rectangular ring surrounding w, and h( ) denotes a histogram of color.

5. A computer-implemented method for rapid object detection, comprising:
   an act of causing a data processor to execute instructions stored on a non-transitory memory such that upon execution, the data processor performs operations of:
   oversegmenting an input image into a set of superpixels, each superpixel comprising a plurality of pixels;
   determining, for each superpixel, a bounding box defining a region of the input image representing a detection hypothesis;
   calculating, for each superpixel, an average residual saliency (ARS) for the plurality of pixels belonging to the superpixel;
   eliminating each detection hypothesis that is out of a range of a predetermined threshold value for object size, resulting in a first set of remaining detection hypotheses;
   eliminating each remaining detection hypothesis in the first set of remaining detection hypotheses having an ARS below a predetermined threshold value, resulting in a second set of remaining detection hypotheses;
   calculating, for each remaining detection hypothesis in the second set of remaining detection hypotheses, color contrast for the region defined by the bounding box, and eliminating each detection hypothesis in the second set of remaining detection hypotheses having a color contrast below a predetermined threshold value, resulting in a third set of remaining detection hypotheses; and
   outputting the third set of remaining detection hypotheses to a classifier for object recognition.

6. The method as set forth in claim 5, wherein the data processor further performs an operation of using quick-shift image segmentation for oversegmenting the input image.

7. The method as set forth in claim 5, wherein the data processor further performs an operation of calculating a spectral residual saliency map for the input image, wherein the spectral residual saliency map is used to calculate the ARS for the plurality of pixels within each superpixel.

8. The method as set forth in claim 5, wherein the data processor further performs an operation of calculating color contrast as follows:

$$CC(w,S)=\chi^2(h(w),h(S)),$$

where CC denotes color contrast, w denotes a bounding box in a detection hypothesis, S is a rectangular ring surrounding w, and h( ) denotes a histogram of color.

9. A computer program product for rapid object detection, the computer program product comprising computer-readable instructions stored on a non-transitory computer-readable medium that are executable by a computer having a processor for causing the processor to perform operations of:
  oversegmenting an input image into a set of superpixels, each superpixel comprising a plurality of pixels;
  determining, for each superpixel, a bounding box defining a region of the input image representing a detection hypothesis;
  calculating, for each superpixel, an average residual saliency (ARS) for the plurality of pixels belonging to the superpixel;
  eliminating each detection hypothesis that is out of a range of a predetermined threshold value for object size, resulting in a first set of remaining detection hypotheses;
  eliminating each remaining detection hypothesis in the first set of remaining detection hypotheses having an ARS below a predetermined threshold value, resulting in a second set of remaining detection hypotheses;
  calculating, for each remaining detection hypothesis in the second set of remaining detection hypotheses, color contrast for the region defined by the bounding box, and eliminating each detection hypothesis in the second set of remaining detection hypotheses having a color contrast below a predetermined threshold value, resulting in a third set of remaining detection hypotheses; and
  outputting the third set of remaining detection hypotheses to a classifier for object recognition.

10. The computer program product as set forth in claim 9, further comprising instructions for causing the processor to perform an operation of using quick-shift image segmentation for oversegmenting the input image.

11. The computer program product as set forth in claim 9, further comprising instructions for causing the processor to perform an operation of calculating a spectral residual saliency map for the input image, wherein the spectral residual saliency map is used to calculate the ARS for the plurality of pixels within each superpixel.

12. The computer program product as set forth in claim 9, further comprising instructions for causing the processor to perform an operation of calculating color contrast as follows:

$$CC(w,S)=\chi^2(h(w),h(S)),$$

where CC denotes color contrast, w denotes a bounding box in a detection hypothesis, S is a rectangular ring surrounding w, and h( ) denotes a histogram of color.

* * * * *